(12) United States Patent
Calman et al.

(10) Patent No.: US 8,972,292 B2
(45) Date of Patent: Mar. 3, 2015

(54) FINANCIAL TRANSACTION ANNOTATIONS

(75) Inventors: Matthew A. Calman, Charlotte, NC (US); Elizabeth Votaw, Potomac, MD (US)

(73) Assignee: Bank of America Corporation, Charlotte, NC (US)

( * ) Notice: Subject to any disclaimer, the term of this patent is extended or adjusted under 35 U.S.C. 154(b) by 1092 days.

(21) Appl. No.: 12/394,979

(22) Filed: Feb. 27, 2009

(65) Prior Publication Data

US 2010/0223165 A1    Sep. 2, 2010

(51) Int. Cl.
*G06Q 40/00* (2012.01)
*G06Q 40/02* (2012.01)

(52) U.S. Cl.
CPC .............. *G06Q 40/02* (2013.01); *G06Q 40/12* (2013.01)
USPC .......................................................... 705/30

(58) Field of Classification Search
CPC .............................. G06Q 40/02; G06Q 20/108
USPC ..................................................... 705/29, 30
See application file for complete search history.

(56) References Cited

U.S. PATENT DOCUMENTS 6,394,341 B1   5/2002  Mäkipää et al.
2004/0209596 A1 * 10/2004 Wong et al. .................... 455/405

OTHER PUBLICATIONS

International Search Report and the Written Opinion of the International Searching Authority mailed May 3, 2010 for International Application No. PCT/US2010/025648.
International Preliminary Report on Patentability for PCT/US2010/025648 mailed Sep. 9, 2011.

* cited by examiner

*Primary Examiner* — Shay S Glass
(74) *Attorney, Agent, or Firm* — Michael A. Springs; Moore & Van Allen PLLC; Nicholas C. Russell

(57) ABSTRACT

Embodiments of the invention relate to systems, methods, and computer program products for annotating financial transactions. For example, one embodiment of the invention provides a financial institution's computer apparatus having a memory communicably coupled to a processor. In one embodiment, the memory device includes information regarding a plurality of bank accounts stored therein, and the processing device is configured to receive an indication of a transaction involving a first bank account stored in the memory device, send a request for ancillary information about the transaction to a party associated with the first bank account, receive ancillary information, such as a photograph of a product purchased in the transaction, from the party associated with the first bank account, and associate, in the memory device, the received ancillary information with the transaction.

22 Claims, 5 Drawing Sheets

FINANCIAL TRANSACTION ANNOTATIONS

FIELD

In general, embodiments of the invention relate to methods, systems and computer program products for assisting with the tracking of financial transactions.

BACKGROUND

Consumers who wish to track their expenses and other financial transactions in today's world, for example, to maintain a budget, face quite a challenge. Particularly diligent consumers may keep personal journals or transaction registers that they update with detailed notes concerning each transaction. However, the information they record in their personal journals is not tied to their account information as maintained by their banking institution. Currently, payment by check is the only payment option that allows consumers to provide their own notes regarding a particular payment that will eventually be incorporated into their account statement (as visible check images available through an online banking portal, a mobile banking portal, or an account statement). For all other types of transactions, consumers have little opportunity to contribute to transaction information that will appear in their account statements or records for reference. Therefore, despite their diligence, these consumers must undertake the inconvenient task of reconciling their account statements with their personal transaction journals and saved receipts to ensure that each transaction recounted in the account statement is legitimate and is accounted for in the consumer's journal or otherwise incorporated into the consumer's budget.

The challenge is even greater for those less-diligent consumers who rely entirely on their various account statements, their memory, and an occasional saved receipt to determine their progress in maintaining a budget. These consumers have not maintained a detailed record for reference when reviewing account statements, and are at a disadvantage when attempting to reconcile expenses. Indeed, the limited information provided in the account statement, especially when combined with a spotty memory and misplaced receipts, is often insufficient to allow a consumer to properly categorize expenses or even determine if a particular expense was legitimate. Furthermore, in the event a dispute or question arises regarding a transaction, a consumer may not be able to accurately recall the specific substance of the transaction. Therefore, there remains a need for an improved system for assisting a consumer with the tracking of the consumer's transactions.

SUMMARY OF EMBODIMENTS OF THE INVENTION

Embodiments of the invention relate to systems, methods, and computer program products for annotating financial transactions. For example, some embodiments of the present invention provide an apparatus comprising a communication device and a processing device communicably coupled to the communication device, wherein the processing device is configured to receive an indication of a financial transaction, use the communication device to send a request to a party involved in the financial transaction, wherein the request includes a request for ancillary information about the financial transaction, use the communication device to receive ancillary information about the financial transaction from the party, and associate, in a memory device, the received ancillary information about the financial transaction with the financial transaction.

In some embodiments, the party involved in the financial transaction is a party associated with an account involved in the transaction. Indeed, in some embodiments, the party involved in the financial transaction is a consumer making a purchase as at least part of the financial transaction.

In some embodiments, the apparatus described above further includes a memory device, wherein the memory device comprises information about an account used in the financial transaction, wherein the information about the account includes information about a system to use to contact a person associated with the account, and wherein the processing device is configured to use the communication device to send the request to the party involved in the financial transaction by using the system to send the request to the person associated with the account. In some embodiments, the processing device is configured to communicate the received ancillary information over a network for display on a remote device.

According to some embodiments, the party involved in the financial transaction is a vendor making a sale of at least part of the financial transaction. In some embodiments, the processing device is configured to use a mobile telephone system to send a request to a party involved in the financial transaction. In other embodiments, the processing device is configured to use a text messaging system to send a request to a party involved in the financial transaction. In still other embodiments, the processing device is configured to use an e-mail system to send a request to a party involved in the financial transaction.

In some embodiments of the invention, the ancillary information comprises a textual description of a product purchased during the financial transaction. In other embodiments, the ancillary information comprises an image a product purchased during the financial transaction. In other embodiments, the ancillary information comprises a video or audio file portraying information about the financial transaction or about a product associated with the financial transaction. In still other embodiments, the ancillary information comprises a hyperlink to a website associated with the party involved in the financial transaction. In some embodiments, the financial transaction comprises the purchase of goods or services from a vendor and the party involved in the transaction comprises the vendor, and the website comprises a web page containing a coupon, a customer survey, or customer service information.

In some embodiments, the processing device is configured to use the communication device to send the request to a mobile computing device associated with the party involved in the financial transaction, receive a photograph of a product involved in the financial transaction, and provide, via a network, the photograph to a user requesting information about the financial transaction.

Embodiments of the present invention also provide a method implemented by a computerized apparatus configured for annotating financial transaction information, where the method includes the following steps: (1) receiving financial transaction information related to a financial transaction, wherein the financial transaction information is received electronically through a first communication channel; (2) attributing the financial transaction to an account of a consumer; (3) receiving ancillary information related to the financial transaction, wherein the ancillary information is received electronically through a second communication channel; and (4) recording in the account the financial transaction information and the ancillary information such that they are correlated in the account.

In some embodiments, the ancillary information is received from the consumer. Indeed, in some embodiments, the ancillary information is received via text message or email. In other embodiments, the ancillary information is received via an online banking platform.

In some embodiments, the method includes another step of electronically contacting the consumer to inform the consumer of the financial transaction and invite the consumer to reply with ancillary information. In some embodiments, the consumer is contacted via text message or email. In certain embodiments, electronically contacting the consumer comprises electronically communicating a message to a consumer's personal computing device, wherein the message permits the consumer to reply to the message with the ancillary information.

According to embodiments of the present invention, the method may also include posting the ancillary information such that it may be accessed by the consumer through an online banking platform.

In some embodiments, the financial transaction is a payment made by or to the consumer. In other embodiments, the financial transaction is a withdrawal from or a deposit to the account. In some embodiments, the ancillary information is received from a party directly involved in the transaction other than the consumer. According to certain embodiments, the financial transaction is the purchase of goods or services by the consumer from a vendor and the party is the vendor.

According to some embodiments, the method is performed by a banking institution that manages the account of the consumer. In some embodiments of the invention, the first communication channel is a financial transaction authorization channel, and the second communication channel is a mobile telephone, Internet, text messaging, or email channel.

Embodiments of the present invention also provide an apparatus for annotating financial transaction information including a communication device configured to receive ancillary information relating to a financial transaction engaged in by a consumer and a processing device configured to record basic transaction information relating to the financial transaction in an account of the customer, record the ancillary information in the account of the consumer such that it is related in the account to the basic transaction information, and make the basic transaction information and the ancillary information accessible to the consumer via an online banking platform.

In some embodiments, the apparatus further includes a memory device comprising computer-readable instructions configured to instruct the processing device to record the basic transaction information, record the ancillary information, and make the basic transaction information and the ancillary information accessible to the consumer.

Embodiments of the present invention also provide a computer program product for annotating financial transaction information comprising a computer-readable medium having computer-readable program instructions stored therein, wherein said computer-readable program instructions comprise first instructions configured for recording in a consumer's account financial transaction information related to a financial transaction engaged in by the consumer, second instructions configured for receiving, via a network, ancillary information related to the financial transaction, and third instructions configured for correlating in the account the ancillary information to the financial transaction information.

In some embodiments, the computer program product also has instructions configured for receiving the financial transaction information from a first communication channel and instructions configured for receiving the ancillary information from a second communication channel different from the first communication channel. In some embodiments, the first communication channel comprises a payment authorization network, and the second communication channel comprises a network in communication with a consumer computer system. According to some embodiments, the computer program product further includes instructions configured to send an indication of the financial transaction to the consumer via the second communication channel, wherein the indication invites the consumer to respond with the ancillary information.

In some embodiments, the computer program product also includes instructions configured for identifying a communication mechanism associated with the consumer's account and instructions configured for using the communication mechanism to send a request to the consumer for ancillary information related to the financial transaction. In some embodiments, the computer program product includes instructions configured for sending a request for ancillary information related to the financial transaction, wherein the instructions are configured to send the request to a party associated with the financial transaction or the consumer's account, and wherein the instructions are configured to send the request in response to receiving the financial transaction information related to the financial transaction.

Embodiments of the present invention provide an apparatus comprising a communication device and a processing device communicably coupled to the communication device, wherein the processing device is configured to receive first information about a financial transaction from a first channel, receive second information about the financial transaction from a second channel different from the first channel, and associate, in a memory device, the first information with the second information. In some embodiments, the first information is a transaction authorization request for the financial transaction, and the second information is ancillary information about the financial transaction from a party involved in the financial transaction. In some embodiments, the first channel is a payment authorization network, and the second channel is a network in communication with a consumer computer system.

According to certain embodiments, the processor is further configured to use the second channel to send an indication of the financial transaction to a party involved in the financial transaction via the second channel, wherein the indication invites the party to respond with the second information. In some embodiments, the party involved in the financial transaction is a party associated with an account involved in the financial transaction.

In some embodiments, the processor is further configured to identify a communication mechanism associated with an account involved in the financial transaction, and use the identified communication mechanism to send a request to a party involved in the financial transaction for ancillary information related to the financial transaction.

Embodiments of the present invention provide a banking system comprising a memory device comprising information regarding a plurality of bank accounts stored therein and a processing device configured to receive an indication of a transaction involving a first bank account stored in the memory device, send a request for ancillary information about the transaction to a party associated with the first bank account, receive ancillary information from the party associated with the first bank account, and associate, in the memory device, the received ancillary information with the transaction.

In certain embodiments, the memory device comprises information about the first bank account, and the information about the first bank account includes information about how the banking system should send the request for ancillary information to a party associated with the first bank account. In some embodiments, the processing device is further configured to provide a user, via an online banking portal, transaction information about a plurality of transactions associated with the first bank account, and the transaction information provided to the user is the received ancillary information. According to some embodiments, the request for ancillary information is sent to a mobile terminal associated with a consumer involved in the transaction, and the received ancillary information is information received from the mobile terminal, which may include a photograph of a product, a product serial number, an image of a receipt, or a textual description of a product. Indeed, inasmuch as the content of the received ancillary information is determined by the consumer, the received ancillary information may include any electronic data of the consumer's choosing, in any transmittable format.

BRIEF DESCRIPTION OF THE DRAWINGS

Figure 1:
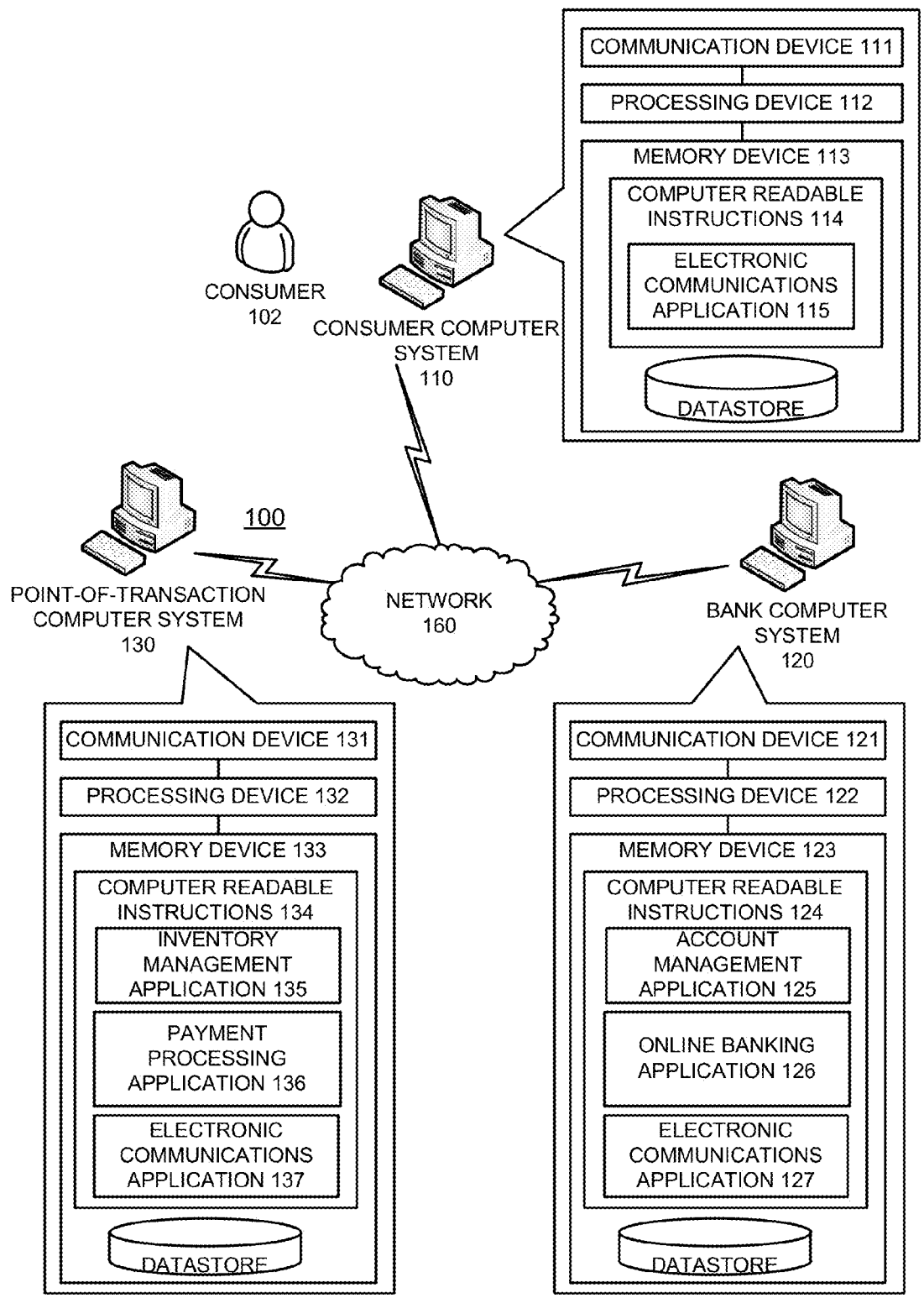
Figure 2:
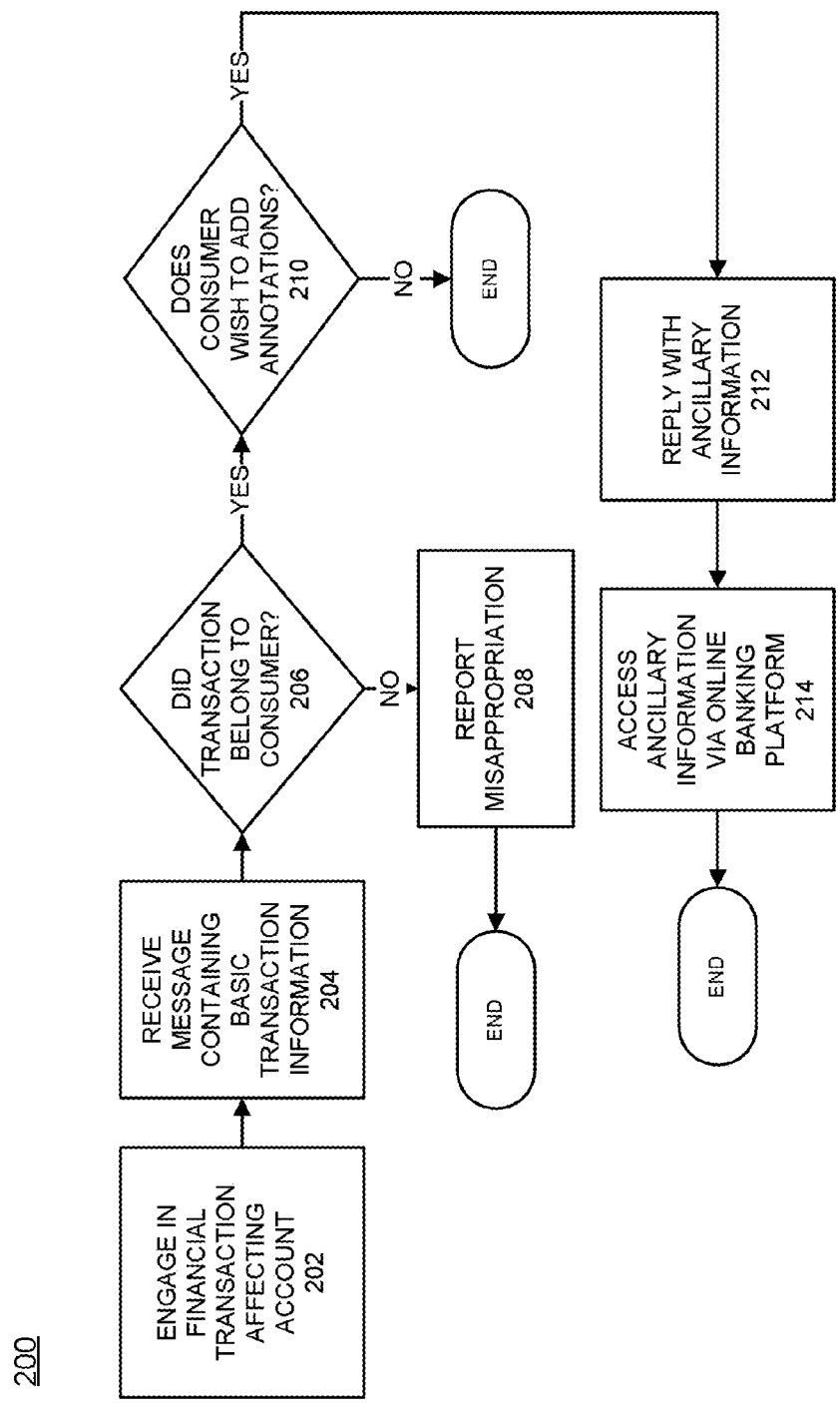
Figure 3:
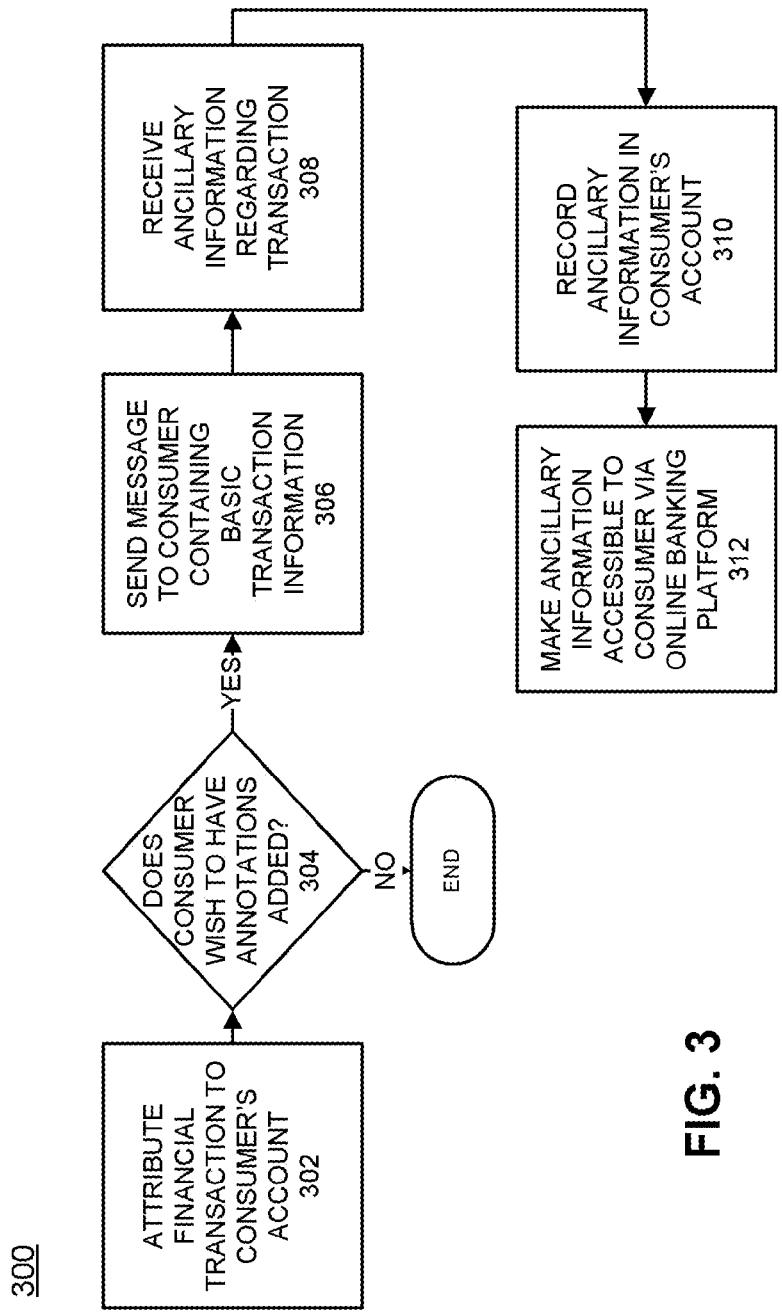
Figure 4:
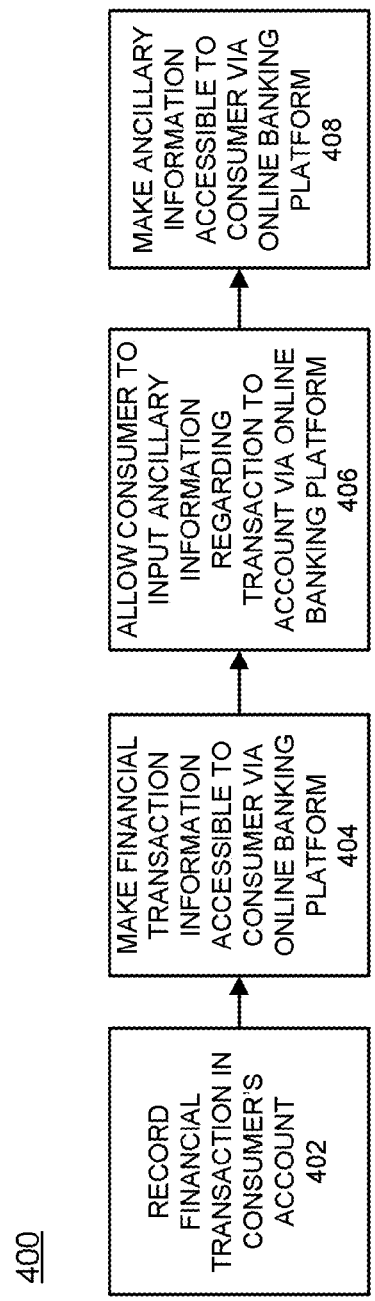
Figure 5:
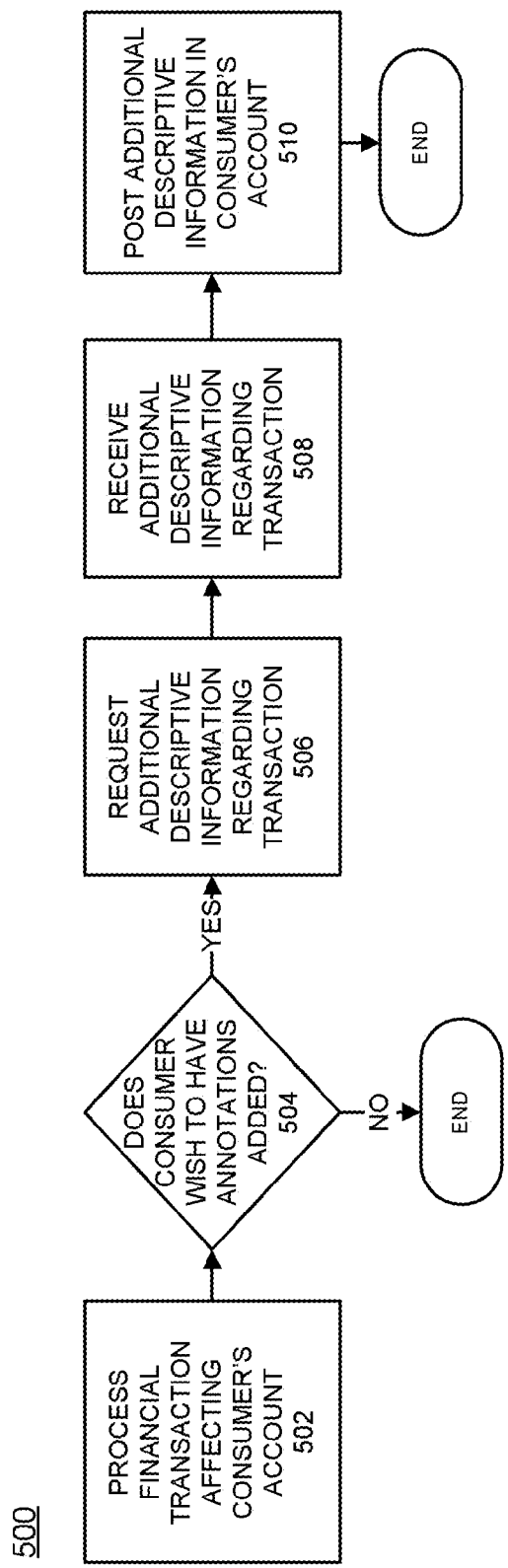

Having thus described embodiments of the invention in general terms, reference will now be made to the accompanying drawings:

FIG. 1 illustrates a financial transaction annotation system and an environment in which the system exists and the methods described herein are implemented according to an embodiment of the invention;

FIG. 2 is a flow chart illustrating an exemplary method of annotating financial transaction information, from the perspective of a consumer, in accordance with an embodiment of the invention;

FIG. 3 is a flow chart illustrating an exemplary method of annotating financial transaction information, from the perspective of a banking institution, in accordance with an embodiment of the invention;

FIG. 4 is a flow chart illustrating another aspect of annotating financial transaction information in accordance with one embodiment of the present invention; and FIG. 5 is a flow chart illustrating yet another aspect of annotating financial transaction information in accordance with one embodiment of the present invention.

DETAILED DESCRIPTION OF EMBODIMENTS OF THE INVENTION

Embodiments of the present invention now will be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Embodiments of the present invention generally concern the attachment of ancillary descriptive information pertaining to a financial transaction engaged in by a consumer to the underlying basic financial transaction information stored in the consumer's account. For example, some embodiments of the invention allow a consumer to generate notes, photos, videos, etc. ("annotations") that pertain to a purchase or sale and submit the annotations to her bank, where the annotations are stored in her account (and attached to the underlying account entry for the purchase) for future reference. In some embodiments, the consumer may generate and submit her annotations at the point-of-sale. For example, upon initiating payment for a purchase, the consumer may receive a text message or email from her bank that requests that the consumer provide annotations. While the consumer is still standing at the checkout counter, she can use her cell phone or other personal mobile electronic device to quickly take a photograph of the goods being purchased (or even the receipt), type a descriptive note, and/or record an audio or video statement about the purchase. Thereafter, the consumer can reply to the bank's text message or email with the just-generated content. This content will form the substance of the annotation that the bank stores in the consumer's account. Later, when the consumer views her account through the bank's online banking service, she can view the annotation she submitted and use it to refresh her memory and help her in tracking her expenses.

In other embodiments of the invention, the consumer may not be the party generating and submitting the annotations that will be stored in her account. For example, where the consumer makes a purchase using a debit card, the merchant may be the source of the annotations. In this case, the consumer's bank, upon being made aware of the purchase (as the payment is processed), may request that the merchant submit annotations. The merchant may respond to the request with stock photos, specifications, digital receipt, coupons, and/or other information that the merchant has on hand. Again, this information will form the substance of an annotation that the bank stores in the consumer's account in connection with the account entry representing the purchase. It should be understood that the foregoing scenarios are merely illustrations of certain embodiments of the present invention, and are presented for the purposes of example only. Therefore, they should not be read to limit the scope of the present invention or the manner in which embodiments of the present invention may be implemented.

As will be appreciated by one of skill in the art, the present invention may be embodied as a method, system/apparatus, computer program product, or a combination of the foregoing. Accordingly, embodiments of the present invention may take the form of an entirely software embodiment (including firmware, resident software, micro-code, etc.), an entirely hardware embodiment, or an embodiment combining software and hardware aspects that may generally be referred to herein as a "system." Furthermore, embodiments of the present invention may take the form of a computer program product on a computer-readable medium having computer-usable program code embodied in the medium.

Any suitable computer-readable medium may be utilized. The computer-readable medium may be, for example but not limited to, an electronic, magnetic, optical, electromagnetic, infrared, or semiconductor system, apparatus, device, or medium. More specific examples of the computer readable medium include, but are not limited to, a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

Computer program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described below with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block(s).

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

FIG. 1 illustrates an exemplary financial transaction annotation system 100 environment in which an embodiment of the present invention exists. As shown in FIG. 1, in one embodiment, the financial transaction annotation system 100 includes a consumer computer system 110, a point-of-transaction ("POT") computer system 130, and a bank computer system 120. Although, for simplicity, FIG. 1 only illustrates one of each computer system, it will be appreciated that, in some embodiments of the invention, there will be many consumer computer systems 110, many POT computer systems 120, and/or many bank computer systems 120. Furthermore, although the term "bank" is used herein to describe some embodiments of the invention, other embodiments of the invention many involve other financial institutions in addition to or as an alternative to a bank. As used herein and in the claims, the term "financial institution" refers to an institution that acts as an agent to provide financial services for its clients or members by processing financial transactions for its clients or members. Financial institutions can include, but are not limited to, banks, building societies, credit unions, stock brokerages, asset management firms, savings and loans, money lending companies, insurance brokerages, insurance underwriters, dealers in securities, and similar businesses. Retail, wholesale, and service businesses, as well as manufacturers, may also process financial transactions as disclosed herein. As such, the bank computer system 120 of FIG. 1 could be the computer system of another financial institution involved in banking or other financial transactions, but not traditionally thought of as a bank.

Referring again to the embodiment illustrated in FIG. 1, the consumer computer system 110, and the point-of-transaction ("POT") computer system 130 are operatively coupled, via a network 160, to the bank computer system 120. The network 160 may be a global area network (GAN), such as the Internet, a wide area network (WAN), a local area network (LAN), or any other type of network or combination of networks. The network 160 may provide for wireline, wireless, or a combination of wireline and wireless communication between devices in the network. It will be understood that when two components are described herein as communicating over a network, the components may be directly coupled to each other or indirectly coupled via one or more other components. Furthermore, although at least some of the systems described herein are described as having several unique components, these components need not be separate and distinct from one another, and two or more of such components may, in some embodiments, be combined into a single component that performs all of the functions of the multiple components so combined as described herein.

As illustrated in FIG. 1, the consumer computer system 110 generally comprises a communication device 111, a processing device 112, and a memory device 113. The processing device 112 is operatively coupled to the communication device 111 and the memory device 113. The processing device 112 uses the communication device 111 to communicate with the bank computer system 130 over the network 160. The processing device 112 also uses the communication device 111 to communicate with the consumer 102. As such, the communication device 111 generally comprises a modem, server, wireless card, radio, and/or other device for communicating with other devices on the network 160, and a display, mouse, keyboard, microphone, touch pad, touch screen, speaker, and/or other device for communicating with the consumer 102.

As used herein and in the claims, the term "processing device" generally refers to circuitry used for implementing communication and logic functions of the system in which it resides. A processing device may include, for example, a digital signal processor device, a microprocessor device, and various analog-to-digital converters, digital-to-analog converters, and other support circuits. Control and signal processing functions of a system are allocated between these processing devices according to their respective capabilities. The processing device may also include functionality to operate one or more computer applications based on computer-readable instructions (i.e., computer program code) thereof, which may be stored in a memory device in communication therewith. As used herein and in the claims, the term "memory device" generally refers to any device having computer-readable medium configured to store, for example, data and/or one or more computer applications.

As further illustrated in FIG. 1, the consumer computer system 110 includes computer-readable instructions 114 stored in the memory device 113, which include the computer-readable instructions 114 of an electronic communications application 115. The electronic communications application 115 includes one or more computer programs that, when executed by the processing device 112, allow the consumer 102 to receive, store, and transmit electronic messages utilizing the communication device 111. For example, in one embodiment of the present invention, the electronic communications application 115 may include an SMS (Short Message Service) text messaging application, an email application, and/or a picture messaging application.

In one embodiment, the consumer computer system 110 is a consumer's desktop computer. In other embodiments, however, the consumer computer system 110 is a consumer's mobile computing device, which may include, for example, a mobile telephone, a personal digital assistant, a mobile picture taking device, a laptop computer, a mobile email device, a mobile texting device, a mobile music device, a wrist computer, and/or any other mobile terminal.

As illustrated in FIG. 1, the bank computer system 120 generally includes a communication device 121, a processing device 122, and a memory device 123. The processing device 122 is operatively coupled to the communication device 121 and the memory device 123. The processing device 122 uses the communication device 121 to communicate with the consumer computer system 110 and the POT computer system 130 over the network 160. As such, the communication device 121 generally comprises a modem, server, wireless card, radio or other device for communicating with other devices on the network 160.

As further illustrated in FIG. 1, the bank computer system 120 includes computer-readable instructions 124 stored in the memory device 123, which include the computer-readable instructions 124 of an account management application 125, an online banking platform 126, and an electronic communications application 127. The account management application 125 includes one or more computer programs that, when executed by the processing device 122, perform account management functions such as debiting and crediting accounts based on transactions engaged in by account holders, such as consumer 102. The online banking platform 126 is an interactive web-based or mobile device solution that may be accessed by account holders to view their various accounts and perform certain transactions, such as transaction inquiries, fund transfers, bill payments, etc. Finally, the electronic communications application 127 includes one or more computer programs for receiving, storing, and transmitting electronic messages utilizing the communication device 121. Although FIG. 1 illustrates the bank computer system 120 as one system, it is important to note that there can be one or multiple systems, each with similar components that handle the various functions of the bank computer system 120.

The POT computer system 130, also sometimes referred to as a point-of-sale (POS) computer system/terminal, generally includes a communication device 131, a processing device 132, and a memory device 133. The processing device 132 is operatively coupled to the communication device 131 and the memory device 133. The processing device 132 uses the communication device 131 to communicate with the bank computer system 120 over the network 160. As such, the communication device 131 generally comprises a modem, server, or other device(s) for communicating with other devices on the network 160.

As further illustrated in FIG. 1, the POT computer system 130 contains computer-readable program instructions 134 stored in the memory device 133, including computer-readable instructions 134 of an inventory management application 135, a payment processing application 136, and an electronic communications application 137. The inventory management application 135 generally includes one or more computer programs that, when executed by the processing device 132, perform inventory management functions such as adjusting inventory records when goods are delivered and sold and maintaining up-to-date inventory records, which may include product descriptions and illustrative photos of the goods in inventory, in a datastore. The payment processing application 136 generally includes one or more computer programs that, when executed by the processing device 132, perform payment processing functions, for example, in the case of a debit card payment, reading the debit card, contacting the issuing entity, requesting authorization from the issuing entity, receiving authorization from the issuing entity, and receiving the payment. The electronic communications application 137 includes one or more computer programs for receiving, storing, and transmitting electronic messages utilizing the communication device 131. Although FIG. 1 illustrates the POT computer system 130 as one system, it is important to note that there can be one or multiple systems, each with similar components that handle functions herein attributed to the POT computer system 130.

With reference now to FIGS. 2-5, embodiments of the processes of embodiments of the present invention are illustrated. In this regard, FIGS. 2 and 3 are flowcharts illustrating one embodiment of the present invention from the perspectives of the consumer 102 and the bank (as defined below), respectively. More particularly, FIG. 2 provides a flow chart illustrating an exemplary method 200 of annotating financial transaction information, from the perspective of a consumer, in accordance with an embodiment of the invention. FIG. 3 provides a flow chart illustrating an exemplary method 300 of annotating financial transaction information, from the perspective of a banking institution, in accordance with an embodiment of the invention. FIGS. 4 and 5 are flowcharts illustrating other embodiments of the invention.

As represented by block 202 in FIG. 2, the consumer 102 engages in a financial transaction that affects an account of the consumer 102 maintained by a banking institution (referred to herein as the "bank"). The bank computer system 120 is operated by or on behalf of the bank and is used to maintain the account(s) of the consumer 102. In some embodiments, the financial transaction is a payment made or received by the consumer 102. For example, the financial transaction may be the purchase of goods or services by the consumer 102 from a third party. On the other hand, the financial transaction may be the receipt of payment from a third party for services rendered by the consumer 102.

In some embodiments, the payment between the consumer 102 and the third party may be made by credit card, debit card, check, ACH transfer, or other mutually-accepted payment mechanism and effected through the use of the POT computer system 130. As used herein, the term "bank card" refers to a debit card, credit card, or any other device that is used by a consumer to effectuate a financial transaction. As used herein, the term "bank card" is not limited to cards issued by banks and, instead, also includes cards and other devices issued by other financial institutions or their agents. As used herein, the term "bank account" refers to a debit account, credit account, demand deposit account, money market account, savings account, or any other type of account that may be involved in a financial transaction. In general, and in accordance with embodiments of the present invention, the POT computer system 130 processes a bank card, check or ACH transfer payment by utilizing the payment processing application 136 and communicating with the bank computer system 120 using the communication device 131 to get authorization for and/or clearance of the payment.

With regard to the nature of the POT computer system 130, the POT computer system 130 may be any type of computer system used for processing financial transactions and may be operated by or on behalf of any entity or multiple entities, including the consumer 102 or the bank. Furthermore, the POT computer system 130 may be located at the point-of-transaction, or may be in a remote location. For example, if the consumer 102 engages in a financial transaction by purchasing goods from a vendor using her debit card, the POT computer system 130 would generally include the computer system employed by the vendor to process the debit card payment, including, for example, the computer system of the checkout register and debit card kiosk and the computer systems of the vendor's banking institution and any intermediary financial institution. Alternatively, and for the purposes of example only, if the consumer receives a payment from a third party by ACH transfer, the POT computer system 130 would generally include the computer systems employed to transfer the funds. In such a scenario, the POT computer system 130 may be owned and operated by the bank and may even be integrated with the bank computer system 120. As another example, the consumer 102 may be equipped to receive bank card payments, in which case the POT computer system 130 used to process such transactions may be owned, operated, or otherwise employed by the consumer 102. In yet another example, the consumer 102 may make a purchase online or through a mobile device system using the consumer's mobile phone or other personal computing device. In such an embodiment, the consumer's mobile phone or other personal computing device may perform the functions of bank card and bank card terminal. The mobile phone or other personal computing device may also then perform the functions of the consumer computer system 110. In other words, the consumer's mobile phone or other personal computing device may serve as both the consumer computer system 110 and a portion of the POT computer system 130, and a vendor server interacting with the consumer's mobile phone or other computing device over a network may serve as another portion of the POT computer system 130. Therefore, it will be understood that, while the POT computer system 130 is illustrated in FIG. 1 as separate from the consumer computer system 110 and the bank computer system 120, it is possible that the consumer computer system 110 or the bank computer system 120 could be combined with the POT computer system 130 and/or perform all of the functions attributed to the POT computer system 130. In other words, in some embodiments, the separations between the computer systems illustrated in FIG. 1 may be conceptual and one or more of the computer systems or portions thereof may be combined with one or more other computer systems or portions thereof.

According to different embodiments of the invention, the financial transaction itself may take on forms different from a credit card, debit card, check, or ACH transfer payment involving the consumer 102 and a third party. For example, in one embodiment, the financial transaction is a transfer of funds between multiple accounts held by the consumer 102. In other embodiments, the financial transaction is a withdrawal from or a deposit to an account of the consumer 102, whether by ATM machine, teller, or otherwise. In each of the foregoing examples, because the bank may be the entity processing the transfer, withdrawal, deposit, or clearance of the check from the account of the consumer 102, the POT computer system 130 may be operated by or on behalf of the bank. Therefore, as discussed above, it may be the case that the POT computer system 130 is not distinct from the bank computer system 120 and that these two computer systems are one and the same. As a general note, the examples of financial transactions provided herein should not limit the type of financial transaction that may be the subject of the present invention, and, indeed, any financial transaction that causes an entry to be made by the bank (using the bank computer system 120) in an account of the consumer 102 is suitable for the methods of embodiments of the present invention, whether such entry is a debit, credit, or otherwise.

In still other embodiments, transactions that do not directly involve the withdrawal or depositing of funds into or from the consumer's bank account may also be added to the consumer's online transaction registry maintained by the bank computer system 120. For example, in one embodiment, another card or device, such as a vendor loyalty card that is not a bank card, can be associated with the consumer's bank so that, whenever the consumer 102 uses the loyalty card or other loyalty device during a cash transaction or during a transaction with another bank card, the bank computer system 120 is notified of the transaction and a message is sent to the consumer computer system 110 to allow the consumer 102 to create a transaction entry in the bank's records for the transaction and annotate the transaction. In this way, the consumer 102 may be able to better track cash transactions (cash which may, for example, have earlier been withdrawn by the consumer 102 from the consumer's bank account) or transactions made using a different bank card. This may allow the consumer 102 to track all or most of her transactions at a single location. In one embodiment, the consumer 102 can associate a vendor loyalty card or other device with the bank and the bank computer system 120 during the loyalty card application process, using the POT computer system 130, using the vendor's website, using the bank's website, or by other systems and procedures.

As described above, where the financial transaction involving the consumer 102 involves the debiting or crediting of a consumer's bank account, the financial transaction is processed by the POT computer system 130 and the bank computer system 120 working in communication with one another. More specifically, the POT computer system 130 uses the communication device 131 and the payment processing application 136 to communicate to the bank computer system 120 information regarding the transaction to be carried out, including the amount of money at issue and the origin and destination of that money, as well as information identifying the consumer 102 and/or the particular account belonging to the consumer 102 that is affected by the transaction. The bank computer system 120 uses the information communicated from the POT computer system 130 to process the financial transaction within the bank. Essentially, the information communicated by the POT computer system 130 includes instructions to the bank computer system 120 to debit, credit, or otherwise adjust a particular account of the consumer 102. Therefore, according to some embodiments of the invention and as represented by block 302 in FIG. 3, the bank computer system 120 utilizes the account management application 125 to attribute the transaction communicated by the POT computer system 130 to the account of the consumer 102 and make an entry in the account of the consumer 102 corresponding to the transaction. In some embodiments, the entry includes a debit or credit of the particular amount that is the subject of the transaction as well as a short description of the transaction.

Once the bank has processed the financial transaction within the bank as described above, in accordance with some embodiments of the invention and as represented by block 304, the bank then determines whether the consumer 102 has previously stated a preference that she receive messages from the bank in order to provide transaction annotations. For example, the consumer 102 may have enrolled in the electronic transaction annotations service and provided a particular email address or phone number to which electronic communications from the bank should be sent. The consumer 102 may also, in one embodiment, be able to select only certain types of financial transactions for which to receive electronic communications from the bank requesting annotations. This preference information would be stored in the memory device 123 of the bank computer system 120 in relation to the account of the consumer 102 so that the bank could locate the information whenever a transaction affecting that account is processed. In the event the consumer 102 has stated a preference of providing annotations, the bank will contact the consumer 102 in an attempt to acquire annotations for the transaction. Alternatively, and according to other embodiments, the bank may not require that the consumer 102 opt-in, and instead contact the consumer 102 following every transaction, perhaps allowing the consumer 102 to opt out. Either way, as represented by block 306, the banking computer system 120, upon attributing the financial transaction communicated by the POT computer system 130 to the account of the consumer 102, automatically uses the communication device 121 and the electronic communications application 127 to transmit a message to the consumer computer system 110.

As represented by block 204, the consumer 102 uses the communication device 111 of the consumer computer system 110 to view the message received from the bank computer system 120. In some embodiments, the content of the message transmitted to the consumer computer system 110 includes basic transaction information, such as, for example, the amount of the transaction and an identification of the transaction as a purchase, a transfer, a withdrawal, a deposit, etc., and an invitation to respond to the message with additional information regarding the transaction to be included in the account of the consumer 102 as an annotation to the transaction entry. This message may take the form of an SMS text message, an email, a voicemail, a picture, a video, or other electronic message form. Where the POT computer system 130 and the bank computer system 120 are able to process a payment or other transaction in real-time or near-real-time, which is the case for many of the financial transactions that are the subject of embodiments of this invention, the consumer 102 may receive the electronic message at the point-of-transaction or very shortly after leaving the point-of-transaction. This advantageously allows the consumer 102 to provide annotations while the transaction is still fresh in her mind, and, in some situations, may allow the consumer 102 to use the point-of-transaction environment to create her annotations.

In some embodiments and as represented by block 206, the consumer 102 will determine whether the transaction described in the message was initiated by her or a person authorized to make transactions involving her account. In the event that the transaction was not initiated by the consumer 102 or a person authorized by the consumer 102, according to some embodiments and as represented by block 208, the consumer 102 may contact the bank to report the unauthorized transaction. In one embodiment, the consumer 102 can use the consumer computer system 110 to reply to the message with a notification that the transaction for unauthorized.

On the other hand, in the event the consumer 102 does recognize the transaction as belonging to her or an authorized individual, the consumer 102 has the option of responding to the message with additional information, as shown in block 210. If the consumer receives the message from the bank at the point-of-transaction, the consumer 102 may choose to send the responsive message immediately, or may choose to delay sending the responsive message until a later time. In either event, in accordance with some embodiments, and as represented by block 212, the consumer 102 uses the communication device 111 of the consumer computer system 110 as well as the electronic communications application 127 to transmit a responsive message to the bank computer system 120.

The responsive message may include text, photos, audio, video, or any other electronic data in any transmittable format that the consumer 102 wishes to have associated with the transaction for future reference. In some embodiments, the consumer 102 may transmit a short narrative about the transaction, for example, the reason for a particular withdrawal or transfer or a description of items purchased, why the items were purchases, and/or where the items were purchased. In some embodiments, the consumer 102 may transmit a photograph representing the goods or services at issue in the transaction in addition to or in lieu of text. In some embodiments, the consumer 102 may photograph a purchased item's serial number or other identifier. As the content transmitted by the consumer 102 is completely within the control of the consumer 102, the content may be any content that the consumer 102 wishes to be associated with the transaction. For example, it is within the scope of embodiments of the present invention if the consumer 102 transmits, in response to the message from the bank, a photograph or name of a salesperson who provided unsatisfactory service so that the consumer 102 can report the problem later. Because the consumer 102 will be able to access the information she provides in the future, as described in detail below, the consumer 102 may wish to transmit information only tangentially related to the substance of the transaction just so that it will be safely recorded. Furthermore, it is also possible that the consumer 102 will transmit more than one message in response to the invitation from the bank. As described in further detail below, each of these messages may be attached to the basic transaction entry in the account of the consumer 102 stored in the memory of the bank computer system 120 so that it may be referenced later.

As shown in block 308, according to some embodiments, the message transmitted by the consumer 102 is received by the bank computer system 120 by way of the communication device 121. In some embodiments, and as represented by block 310, the bank computer system 120, utilizing the account management application 125, records the content of the message received from the consumer 102 in the account of the consumer 102 affected by the transaction. In addition to the content provided by the consumer 102, the bank computer system 120 may also record metadata such as the time and date that the content was provided.

According to some embodiments of the invention, the bank computer system 120, utilizing the account management application 125, records all of the data, including both the content provided by the consumer 102 and any metadata, in the account of the consumer 102 in such a way that it is related to the account entry setting forth the basic transaction information. Therefore, the bank computer system 120 records, in the account of the consumer 102, both the basic transaction information, as communicated by the POT computer system 130 (described in detail above), as well as the ancillary transaction information provided by the consumer 102 in the responsive electronic message. It is possible that the ancillary information for a particular transaction could be recorded after or concurrently with the recording of the basic transaction entry, as long as the bank computer system 120 stores the ancillary information such that it is related to the basic transaction entry in the account of the consumer 102. Thus, the ancillary information serves as an "annotation" to the basic transaction information.

Once the basic transaction entry and ancillary information are both recorded in the account of the consumer 102 as described above, according to some embodiments of the present invention and as represented by block 312, the bank computer system 120 makes the recorded information accessible to the consumer 102 through the online banking platform 126. In some embodiments, and as represented by block 214, the consumer 102 may log on to the online banking platform 126 to view her account(s), including the recorded information. In some embodiments, the consumer 102 uses the consumer computer system 110 to access the online banking platform 126.

The online account statement visible to the consumer 102 through the online banking platform 126 generally includes the basic transaction information relating to previous transactions. For example, the entries in the online account statement may be organized by date and include the amount of the transaction, whether it was a debit or credit to the account, as well as a short description of the transaction. In some embodiments, for an entry that has a recorded annotation correlated to it in the account, a hyperlink may be provided in association with the entry that allows the consumer 102 to click-through the hyperlink to view or retrieve the annotation. In such embodiments, if there are more than one annotations (based on separate messages from the customer 102), then those annotations may all be provided after a single hyperlink or their may be multiple hyperlinks. In other embodiments, the annotated content may be visible on the main account statement page. It will be understood that there are many ways in which the basic transaction information, as communicated by the POT computer system 130, and the annotations may appear in the online banking platform, and any method of display that allows the consumer 102 to view or retrieve the annotations in such a way that it is clear that a particular annotation is associated with a particular transaction is sufficient for the purposes of embodiments of the invention.

In some embodiments of the invention, the consumer 102 also uses the online banking platform 126 to edit existing annotations and provide new annotations for transactions having entries appearing in the online account statement. In this regard, the online account statement may provide the option for the consumer 102 to select a particular transaction appearing in the online account statement in order to view, edit, or add annotations. For example, and according to one embodiment of the invention, there may be provided one or more hyperlinks in association with a transaction entry in the online account statement. In the event the consumer had already provided annotations for a particular transaction, at least one hyperlink would be provided for viewing or retrieving the annotations. If the consumer 102 clicks through the hyperlink, she views the annotation(s) that she had previously provided, either by responsive message to the bank or through the online banking platform 126 as described below, and is given the option of editing the annotation or deleting the annotation altogether. Another hyperlink may be provided for adding annotations. Thus, according to some embodiments, the consumer 102 may add annotations to transactions appearing in her account without responding to a message received from the bank by utilizing the online banking platform 126. This may be advantageous if a period of time has elapsed since the transaction occurred and the consumer 102 no longer has access to the message from the bank.

According to other embodiments of the invention, the bank may never contact the consumer 102 to request annotations, and instead may embody an entirely passive role wherein the consumer 102 can utilize the online banking platform 126 to generate annotations. For example, and as represented by block 402 of FIG. 4, the banking computer system 120 records a transaction affecting an account of the consumer 102 in the account's transaction history. As represented by block 404, the basic transaction information is entered into the online account statement of the customer 102 for viewing though the online banking platform 126. As described in detail above, according to some embodiments, the online banking platform provides at least one hyperlink in association with the transaction entry in the online account statement for the consumer 102 to use in order to add ancillary information regarding the transaction. Therefore, as represented by block 406, in one embodiment, the banking computer system 120 allows the consumer 102 to provide her own annotations for a transaction through the online banking platform 126. As shown in block 408, and according to some embodiments, this ancillary information is incorporated into the online account statement of the consumer 102 in relation to the transaction that it describes, and is visible or otherwise available to the consumer 102 through online banking. For example, the annotation may be visible or retrievable through the use of another hyperlink provided in association with the transaction entry. In this way, in some embodiments, the consumer 102 may provide annotations without receiving messages from the bank. However, as discussed above, the foregoing process may be combined with other embodiments of the invention so that there are multiple ways in which transaction annotations are provided.

According to some embodiments of the invention, the consumer 102 may not be the entity (or the only entity) providing the transaction annotations. Indeed, in some embodiments, an annotation may originate with a vendor or other third party. Just as the bank may request ancillary information from the consumer 102, the bank may request ancillary information from another party having knowledge of the transaction, in addition to or as an alternative to requesting ancillary information from the consumer 102. In particular, the bank may receive ancillary information for an annotation from the POT computer system 130. According to some such embodiments, and as shown in block 502 of FIG. 5, the bank computer system 120 processes a financial transaction affecting an account of a consumer 102 and records the basic transaction data in the account, as previously described in detail. Then, as has been described with regard to consumer-provided annotations, the bank computer system 120 determines whether the consumer 102 has opted-in to have the bank seek additional transaction information. Alternatively, the bank may seek additional information even without the affirmative consent of the consumer 102. In some embodiments, the bank then requests ancillary information from a third party involved in the transaction. According to some embodiments, and as represented by block 504, the bank computer system 120, using the communication device 121, communicates with the POT computer system 130 to request ancillary information. In some embodiments, the bank computer system 120 may communicate this request as part of the communication that takes place between those systems during authorization and/or other processing of the underlying transaction. This may be advantageous as it may not require additional communication to be initiated by the bank. For example, the bank computer system 120 may transmit, along with an authorization for a particular payment to be made, a request for ancillary information.

In some embodiments, the POT computer system 130 receives the request for ancillary information from the bank computer system 120 through the communication device 131. The POT computer system 130 may automatically respond to the request with information relating to the transaction that meets predefined criteria either specified in the request or programmed into the POT computer system 130. In some embodiments, the inventory management application 134 may be utilized in generating the ancillary data. For example, where the transaction is a debit card purchase of products by the consumer 102 from a vendor, as each product is scanned during checkout, the inventory management application 135 is employed to access or retrieve certain records relating to the products and update those records. The payment is processed as the POT computer system 130 communicates with the bank computer system 120. During this communication (or as part of a separate communication), the bank issues a request for additional information and the POT computer system 130 responds to the request by transmitting relevant information, which may include product data stored in the records accessed or retrieved during checkout. The information transmitted may include descriptions, specifications, photos, product codes (e.g., Uniform Product Codes, Stock-Keeping Unit codes, and/or the like), serial numbers, coupons, promotional material, surveillance video, prices, etc. In some embodiments, the information transmitted may include a hyperlink to the vendor's website. In some embodiments, the hyperlink may be used by the consumer 102 to retrieve a web page containing additional product information, coupons or special offers, customer surveys, or customer service information such as return and warranty policies and/or vendor contact information. As shown in block 508, the ancillary information (product data) transmitted by the POT computer system 130 is received by the bank computer system 120 and then stored in the bank card system's memory and associated with the particular transaction and consumer account.

It will be understood that the foregoing example is only one manner in which the POT computer system 130 may provide ancillary information to the bank computer system 120 to be included as annotations to transactions appearing in the account of the consumer 102. In other embodiments, the POT computer system 130 may transmit the ancillary information utilizing the electronic communications application 137, for example by SMS text message, voicemail, vide mail, or email. The information may be manually input to an interface provided in the POT computer system 130 by a cashier or other individual, rather than automatically retrieved using the inventory management application 135. Additionally, it will be understood that, while the ancillary information may originate with a vendor or other entity that is a party to the transaction, it is also possible that the ancillary information could originate with a third party service provider who has a relationship with one of the primary entities involved in the transaction, including the bank. In that instance, the third party's computer systems may be considered part of the POT computer system 130 as described herein.

Once the ancillary information has been received by the bank computer system 120 from the POT computer system 130, the bank computer system 120 records the ancillary information such that it is correlated in the account of the consumer 102 to the underlying transaction to which it relates and may be viewed by the consumer 102 through the online banking platform 126. Therefore, in accordance with some embodiments of the present invention, when viewing a particular transaction appearing in an online account statement via the online banking platform 126, the consumer 102 may be able to view multiple annotations for the transaction originating from multiple sources, including annotations from the consumer 102 provided in response to an electronic message from the bank, annotations provided by the consumer 102 through the online banking platform 126, and annotations provided by a party to the transaction (or such party's service provider) through the POT computer system 130. The consumer 102 may edit, delete, print, and/or otherwise manage the annotations through the online banking platform 126.

In one embodiment of the invention, the ancillary data, or a portion thereof, that is received by the bank computer system 120 is stored in the bank's memory device 123 and is not made readily available to the consumer 102. In some embodiments, such data is made available to the consumer 102 upon request only, while in other embodiments such data may not be made available to the consumer 102 at all. For example, in one embodiment, surveillance video/photos are sent from the POT computer system 130 to the bank computer system 120 for all transactions over a certain dollar threshold for use by the bank's misappropriation investigation unit only. In another example, product number/serial number data and price data are provided to the bank computer system 120 from one of the other computer systems and the bank then offers to the consumer 102 an extended warranty or loss replacement insurance on the purchase.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A method implemented by a computerized apparatus configured for annotating financial transaction information, the method comprising:
   receiving, at an online banking platform, financial transaction information related to a financial transaction, wherein the financial transaction information is received electronically through a first communication channel associated with a point-of-sale;
   attributing the financial transaction information to an account of a consumer;
   prompting the consumer, via a second communication channel associated with the consumer, for ancillary information related to the financial transaction;
   receiving, at the online banking platform and via the second communication channel, the ancillary information related to the financial transaction information, wherein the ancillary information comprises a customer-provided description or purpose of the financial transaction; and
   posting, via the online banking platform, a first entry comprising the financial transaction information;
   posting, via the online banking platform, a second entry comprising the ancillary information comprising the customer-provided description or purpose, wherein the second entry is electronically associated with the first entry in the account.

2. The method of claim 1, wherein the ancillary information is received from the consumer.

3. The method of claim 2, wherein the ancillary information is received via text message or email.

4. The method of claim 2, wherein the ancillary information is received via an online banking platform.

5. The method of claim 1, further comprising:
electronically contacting the consumer to inform the consumer of the financial transaction and invite the consumer to reply with ancillary information.

6. The method of claim 5, wherein the consumer is contacted via text message or email.

7. The method of claim 5, wherein electronically contacting the consumer comprises electronically communicating a message to a consumer's personal computing device, wherein the message permits the consumer to reply to the message with the ancillary information.

8. The method of claim 1, further comprising:
posting the ancillary information such that it may be accessed by the consumer through an online banking platform.

9. The method of claim 1, wherein the financial transaction comprises a payment made by or to the consumer.

10. The method of claim 1, wherein the financial transaction comprises a withdrawal from or a deposit to the account.

11. The method of claim 1, wherein the ancillary information is received from a party directly involved in the transaction other than the consumer.

12. The method of claim 11, wherein the financial transaction comprises the purchase of goods or services by the consumer from a vendor and the party comprises the vendor.

13. The method of claim 1, wherein the method is performed by a banking institution that manages the account of the consumer.

14. The method of claim 1, wherein the first communication channel comprises a financial transaction authorization channel, and wherein the second communication channel comprises a mobile telephone, Internet, text messaging, or email channel.

15. An apparatus for annotating financial transaction information, the apparatus comprising:
an online banking platform in operative communication with a communication device configured to receive ancillary information relating to a financial transaction engaged in by a consumer, wherein the ancillary information relating to the financial transaction is received in response to a prompt presented to the customer requesting the ancillary information, wherein the ancillary information comprises a customer-provided description or purpose of the financial transaction; and
a processing device configured to:
record, via the online banking platform, a first entry comprising basic transaction information relating to the financial transaction in an account of the customer, wherein the basic transaction information is provided at least in part by a party involved in the transaction;
record, via the online banking platform, a first entry comprising the ancillary information in the account of the consumer such that it is related in the account to the basic transaction information; and
make the basic transaction information and the ancillary information accessible to the consumer via the online banking platform.

16. The apparatus of claim 15, further comprising:
a memory device comprising computer-readable instructions configured to instruct the processing device to record the basic transaction information, record the ancillary information, and make the basic transaction information and the ancillary information accessible to the consumer.

17. A computer program product for annotating financial transaction information, the computer program product comprising a non-transitory, computer-readable medium having computer-readable program instructions stored therein, wherein said computer-readable program comprising:
instructions configured for recording, via an online banking platform, in a consumer's account financial transaction information related to a financial transaction engaged in by the consumer, wherein the financial transaction information is received from a communication channel associated with a point-of-sale;
instructions configured to prompt the consumer for ancillary information related to the financial transaction;
instructions configured for receiving, via a network and at the online banking platform, ancillary information related to the financial transaction, wherein the ancillary information is received from a communication with the consumer, and wherein the ancillary information comprises a customer-provided description or purpose of the financial transaction; and
instructions configured for electronically correlating in the account the ancillary information and the financial transaction information, such that the ancillary information and the financial transaction information are associated together.

18. The computer program product of claim 17, further comprising:
instructions configured for receiving the financial transaction information from a first communication channel; and
instructions configured for receiving the ancillary information from a second communication channel different from the first communication channel.

19. The computer program product of claim 18, wherein the first communication channel comprises a payment authorization network, and wherein the second communication channel comprises a network in communication with a consumer computer system.

20. The computer program product of claim 18, further comprising:
instructions configured to send an indication of the financial transaction to the consumer via the second communication channel, wherein the indication invites the consumer to respond with the ancillary information.

21. The computer program product of claim 17, further comprising:
instructions configured for identifying a communication mechanism associated with the consumer's account; and
instructions configured for using the communication mechanism to send a request to the consumer for ancillary information related to the financial transaction.

22. The computer program product of claim 17, further comprising:
instructions configured for sending a request for ancillary information related to the financial transaction, wherein the instructions are configured to send the request to a party associated with the financial transaction or the consumer's account, and wherein the instructions are configured to send the request in response to receiving the financial transaction information related to the financial transaction.

* * * * *